(No Model.)　　　　　　W. H. DICKEY.　　　　5 Sheets—Sheet 1.
RAILROAD SWITCH.
No. 308,597.　　　　　　　　　Patented Dec. 2, 1884.
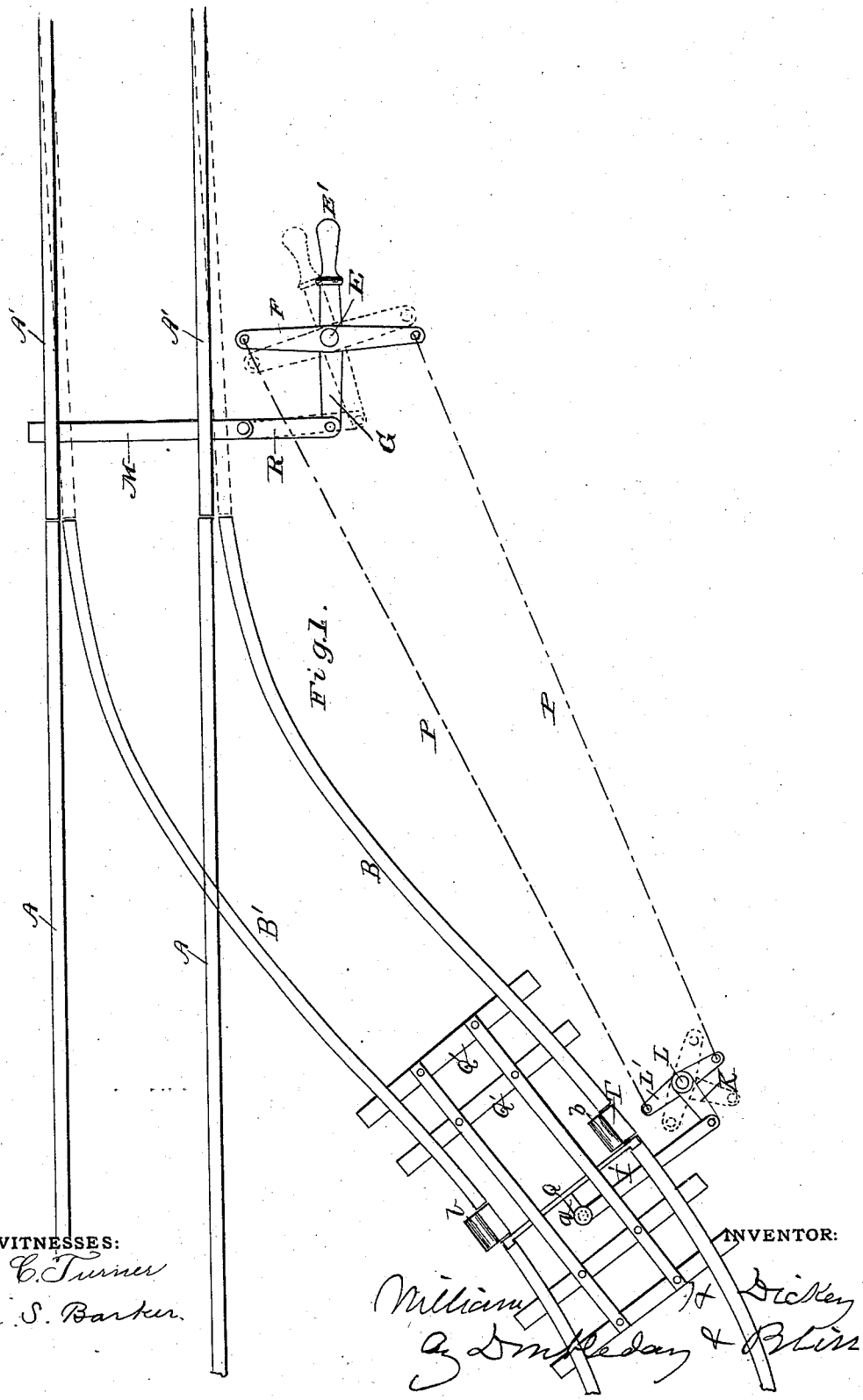
WITNESSES:　　　　　　　　　　　　　　　INVENTOR:

(No Model.) 5 Sheets—Sheet 2.
W. H. DICKEY.
RAILROAD SWITCH.
No. 308,597. Patented Dec. 2, 1884.
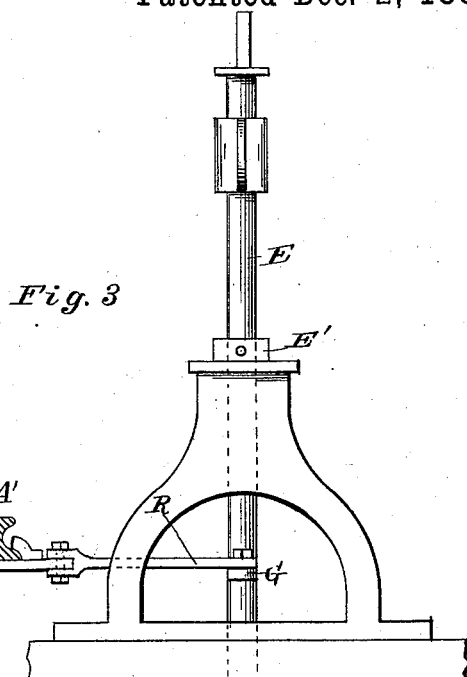
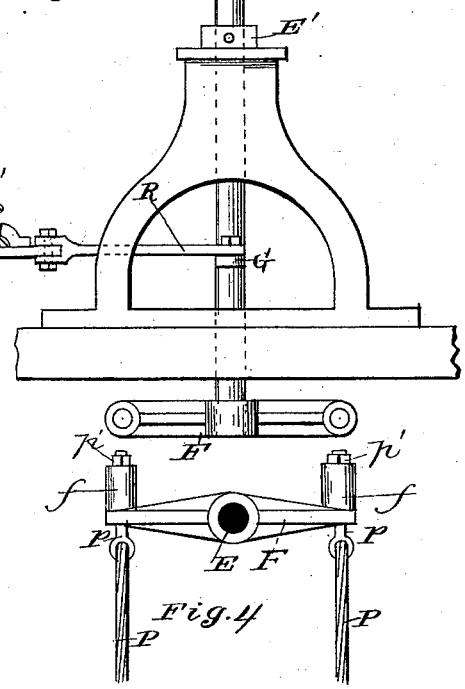
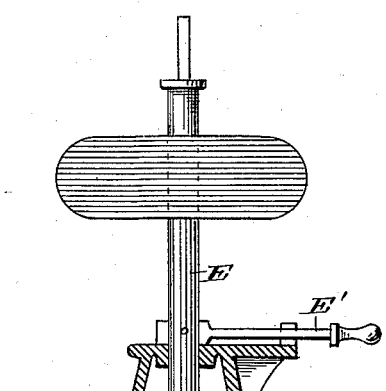
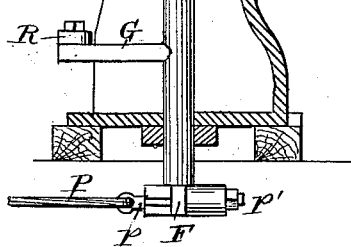
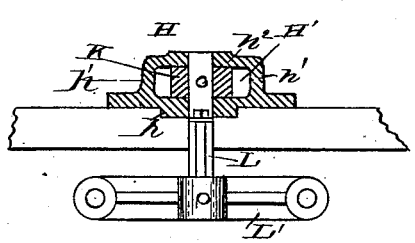
Witnesses:
J. C. Turner
J. S. Barker
Inventor:
William H. Dickey
by Doubleday & Bliss
attys.

(No Model.) 5 Sheets—Sheet 3.
W. H. DICKEY.
RAILROAD SWITCH.
No. 308,597. Patented Dec. 2, 1884.
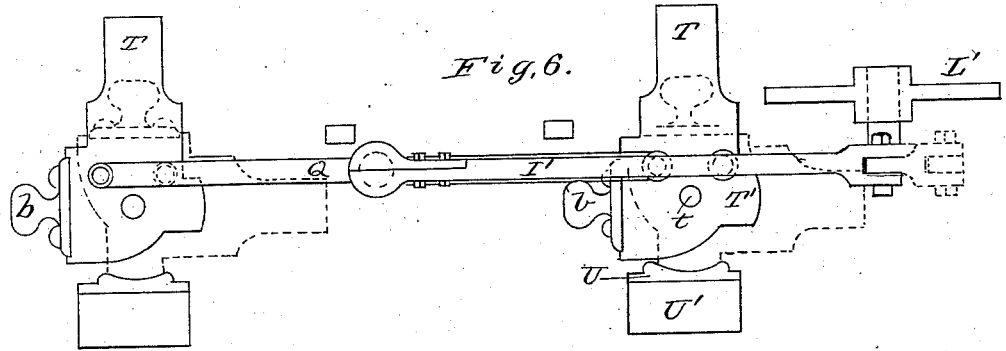
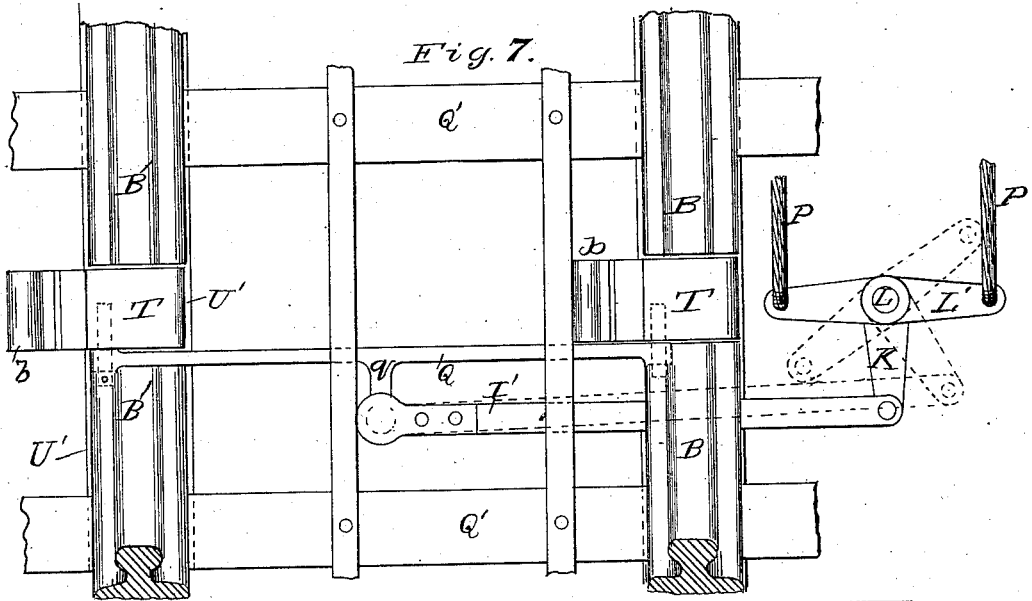
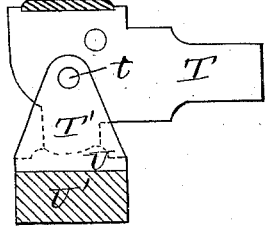
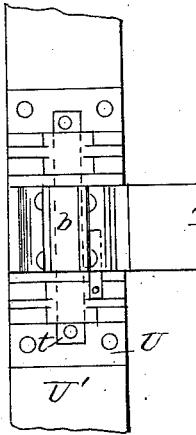
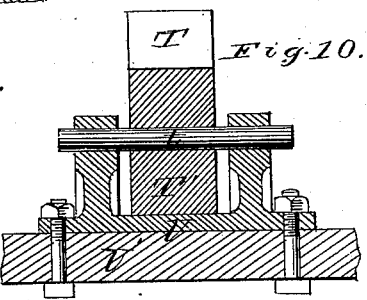
WITNESSES:  
INVENTOR:

(No Model.)
5 Sheets—Sheet 4.
W. H. DICKEY.
RAILROAD SWITCH.
No. 308,597.
Patented Dec. 2, 1884.
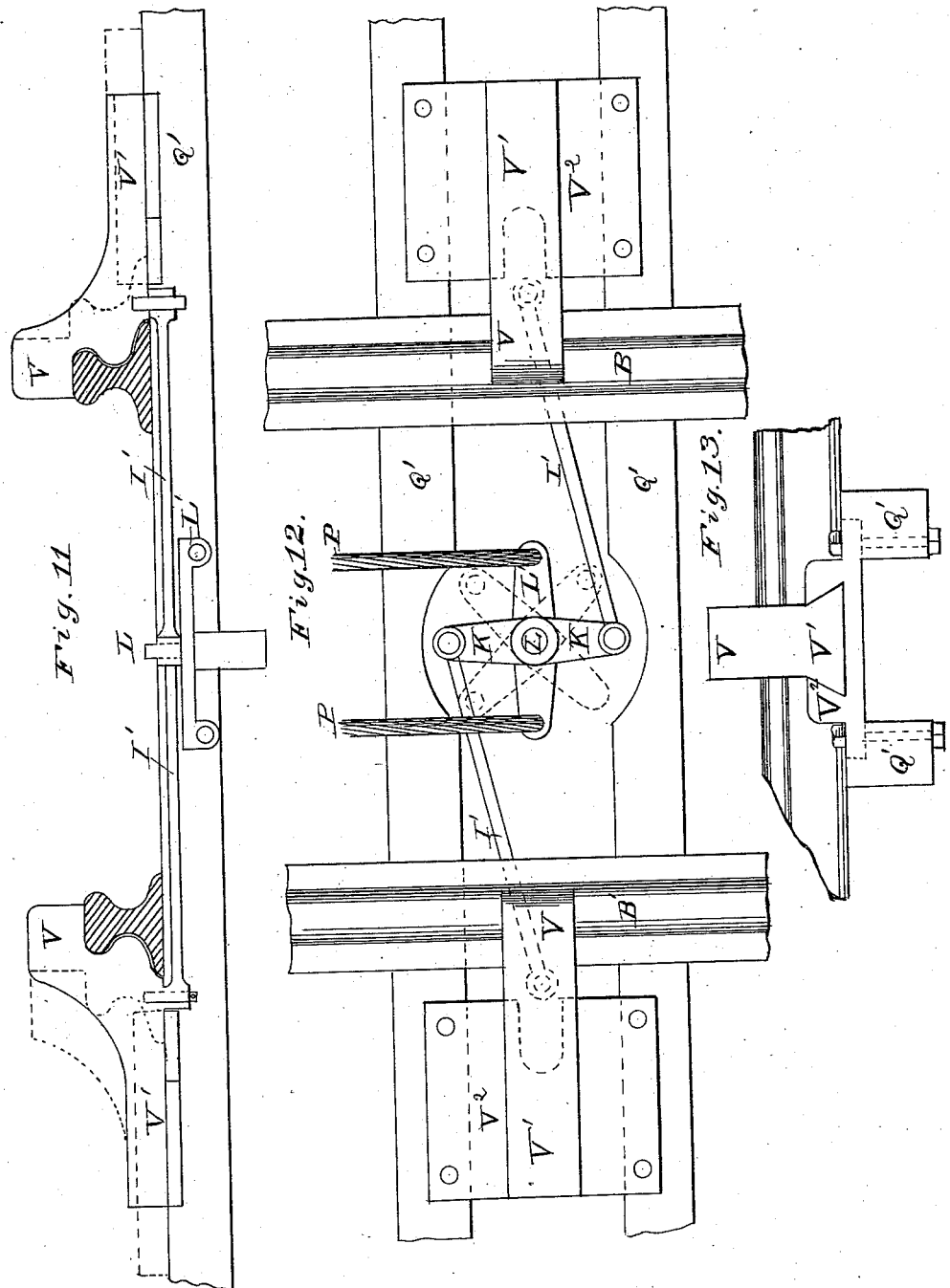
WITNESSES:
J. C. Turner
J. S. Barker.
INVENTOR:
William H. Dickey
by Doubleday & Bliss
attys (No Model.)
W. H. DICKEY.
RAILROAD SWITCH.
No. 308,597. Patented Dec. 2, 1884.
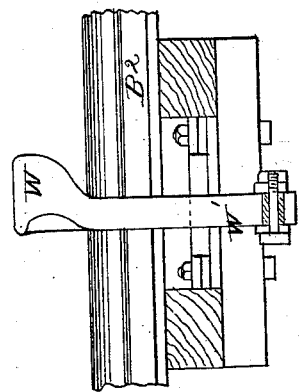
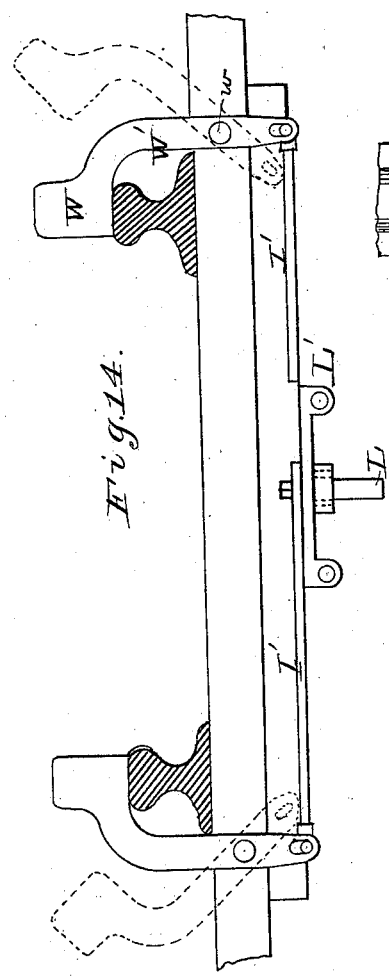
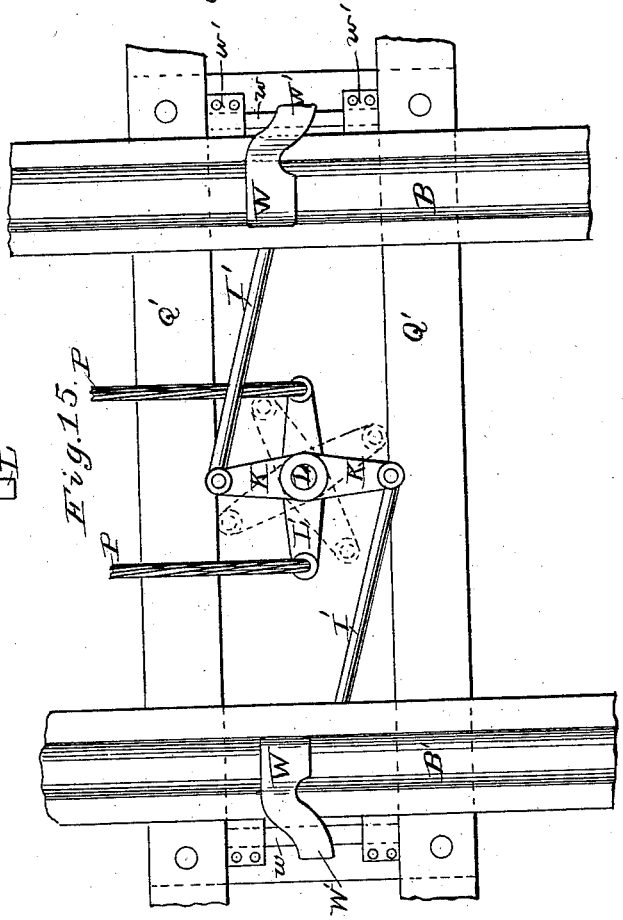
WITNESSES:
J. C. Turner
J. S. Barker.
INVENTOR:
William H Dickey
by Doubleday & Blin
attys

UNITED STATES PATENT OFFICE.

WILLIAM H. DICKEY, OF JACKSON, MICHIGAN.

RAILROAD-SWITCH.

SPECIFICATION forming part of Letters Patent No. 308,597, dated December 2, 1884.

Application filed October 11, 1883. (No model.)

*To all whom it may concern:*

Be it known that I, WILLIAM H. DICKEY, a citizen of the United States, residing at Jackson, in the county of Jackson and State of Michigan, have invented certain new and useful Improvements in Railroad-Switches, of which the following is a specification, reference being had therein to the accompanying drawings.

Figure 1 is a plan view of a section of the main line and siding of a railway-track having my invention applied thereto. Fig. 2 is an elevation, partly in section, of the mechanism for operating the switch in the main line. Fig. 3 is an elevation of the same devices, taken at a right angle to the view in Fig. 2. Fig. 4 is a detached view of the cross-head, showing the means for connecting the links thereto. Fig. 5 is a sectional view of the bearing or support for the stop-moving mechanism. Figs. 6, 7, 8, 9, and 10 are detail views, enlarged, Fig. 6 being a section across the track, Fig. 7 a top view, and Figs. 8, 9, and 10, respectively, a cross-section, a top view, and a longitudinal section, showing the method of mounting the stops. Figs. 11, 12, and 13 illustrate a modification, Fig. 11 being a cross-section, Fig. 12 a top view, and Fig. 13 a detail view showing the support for the stop. Figs. 14, 15, and 16 illustrate another modification, Fig. 14 being a section across the track, Fig. 15 a top view, and Fig. 16 a detail view of the stop from the outside of the track.

In the drawings, A A are the permanent rails of the main line, A' A' the switch-rails, and B B' the rails of the siding.

E is the upright shaft or rocking bar of the switch, and E' is the lever thereof.

G is an arm projecting horizontally from rocking bar E, and connected with a tie-bar or switch-bar, M, by means of a link, R, the tie or switch bar being connected with the free moving ends of switch-rails A' A'.

Any usual or preferred construction of the above-recited parts of the switching mechanism may be adopted.

To the lower end of rocking bar E is firmly attached a cross-head, F.

P P are links, cords, chains, or wire ropes connecting the opposite ends of the cross-head F with a corresponding cross-head, L', which is attached to the lower end of a vertical shaft, L, said shaft being mounted in any suitable step, bearing, or other suitable support firmly bolted or spiked to a sill or cross-tie.

In Fig. 5 I have shown a metallic bearing, H, which I prefer to use as a support and mounting for vertical shaft L. It is formed of a base-plate, $h$, two walls or flanges, $h'$, extending upwardly from the plate $h$, and a cross-bar or plate, $h^2$, connecting the opposite walls, $h'$, at the top. These parts form the bounding-walls of a recess, H', in which lies the rocking bar K, which is connected to the shaft L. By preference I support the upper end of shaft L in apertures in the plates $h$ $h^2$ of this bearing, so that the cross-head and other moving parts lie below the bearing H.

K is a rocking arm lying in the chamber or recess, H', and connected to the upper end of shaft L. It is connected by means of a link, I', to an arm, $q$, projecting horizontally from the reciprocating bar Q, which operates the stops T, to be described.

By mounting the shaft L and arm K, as above described, the entire stop-shifting mechanism is arranged in compact form, and so that the parts project but a few inches above the ground.

In Fig. 4 I have shown a method of connecting the links or ropes P to the cross-heads, whereby the tension may be increased or diminished.

$p$ are screw-threaded eyebolts, to which the links or ropes are attached, passing through hollow studs $f$, formed on the ends of the cross-heads.

$p'$ are nuts engaging with the threaded ends of eyebolts $p$, whereby the tension upon the links or ropes may be kept uniform.

It will be understood that the above-described tension-regulating mechanism may be applied to either the cross-heads F or L', or to both of them.

From the above description it will be seen that whenever the switch in the main line is opened the stops which lie in the path of the wheels of the cars upon the siding will be removed, so that the cars can move freely from the main line to the siding, and vice versa. On the other hand, when the switch is closed, the stops will be automatically and simultaneously interposed in the path of the car-wheels on the switch, thus practically obviating all danger of cars moving from the siding so close to the main line as to endanger passing trains.

Referring to Figs. 6, 7, 8, 9, and 10, which illustrate the stops and means for mounting them, (shown in Fig. 1,) I will describe their details of construction. Each of these stop-blocks is pivoted at $t$ to a bracket or bearing, U, the bearings being bolted or otherwise secured to suitable sills or sleepers, U'. These sleepers are connected by cross-girts Q'; or they may be otherwise supported at suitable distances below the rails. The stops are interposed between the adjacent ends of the rails B B' of the siding.

$b\ b$ are short rail-sections firmly secured to the stop-blocks in such position that they (the rail-sections) may be interposed between the adjacent ends of the rail-sections when the stops T T are withdrawn, thus forming a continuous track for the cars to run upon. The portions T' T' of the stop-blocks are formed in arcs of circles of which the pivots $t\ t$ are the centers, and portions of the brackets or bearings U U are also formed in arcs of similar circles, so that when the short rail-sections are interposed between the permanent rail-sections of the siding the parts T' T' of the stop-blocks shall rest upon the concaved portions of the bearings, so that these parts shall sustain the downward thrust of passing cars, and thus relieve the pivots from undue strain. (See Fig. 8.)

The construction and arrangement of parts are such that when the main-line switch is opened, so as to break the main line, the stops T T are withdrawn from between the ends of the rails and the short rail-sections $b\ b$ are interposed, so as to form a continuous track over which to run the cars upon the siding, whereas, when the main-line switch is closed, so as to complete the main line, the stops T T are interposed in their places, so as to prevent cars which are on the siding from running to the main line.

In Figs. 11, 12, 13, I employ links P P, crosshead, upright shaft, rocking arms, and links I' I', substantially such as have just been described. In these figures, however, V V' are sliding stops supported upon the outer sides of the siding in bearing-plates V², the upper faces of these plates being constructed with dovetailed grooves to receive corresponding dovetails formed upon the under faces of the parts V' V', as shown plainly in Figs. 11 and 13.

As will be readily understood from an examination of the drawings, the upwardly-projecting stop portions V V can be drawn toward each other and directly above the rails into the path of the wheels, so as to effectually block them, as indicated in full lines in Figs. 11 and 12. It will of course be understood that the parts occupy these positions when the main-line switch is closed, the connection of the ropes or links P P with the cross-head of the main-line switch being such that when the main-line switch is opened these stop devices are automatically and simultaneously moved into the position indicated in dotted lines, so that cars can pass freely onto or off from the siding.

In Figs. 14, 15, and 16 I have shown another modification in which the stops W W' are pivoted at $w\ w$, the ends of the pivots being supported in suitable bearings or boxes, $w'\ w'$, which in turn are bolted to a framing or other support below the rails. In this modification the construction and arrangement of parts is also such that when the main-line switch is closed the stops are interposed above the rails, as shown in full lines, Fig. 14; but when the main-line switch is opened the stops are thrown backward from the rails, as indicated in dotted lines, same figure.

What I claim is—

1. The combination, with the main line and the siding, of a switch in the main line, mechanism for moving the switch, a stop adapted to be interposed in the path of the wheels of the cars on the siding, shaft L, the bearing H, for the shaft, links or rods connecting the switch-moving mechanism with shaft L to rock it, and devices connecting shaft L with the stop, substantially as set forth.

2. The combination, with the main line and the siding, of a switch in the main line, mechanism for moving the switch, a stop adapted to be interposed in the path of the wheels of the cars on the siding, the shaft L, the bearing H, in which the upper end of the shaft L is mounted, the arm K, connected with the shaft L and resting in a recess, H', in the bearing, a connecting device between the arm K and the stop, and links or rods connecting the switch-moving mechanism with shaft L, substantially as set forth.

3. The combination, with the main line and the siding, of a switch in the main line, mechanism for moving the switch, carrying a crosshead provided with hollow studs $f$ at its end, a stop adapted to be interposed in the path of the wheels of the cars on the siding, mechanism for moving said stop, links or rods connecting the switch-moving mechanism with the stop-moving mechanism, and screw-threaded adjusting devices attached to the ends of the links or rods and passing through said studs, whereby the tension upon the links may be adjusted, substantially as set forth.

4. The combination, with the main line and the siding, of a switch in the main line, a block situated between two adjacent rails of the siding, it consisting of a short rail-section and a stop, and mechanism adapted to simultaneously move the switch and shift the block in the siding, substantially as set forth.

5. The combination, with the main line and the siding, of a switch in the main line, a block pivoted between two adjacent rails of the siding, it consisting of a short rail-section and a stop, and mechanism adapted to open and close the switch and to simultaneously rock the block so as to interpose in the path of the car-wheels the short rail-section and the stop respectively, substantially as set forth.

6. The combination, with the main line and the siding, of a switch in the main line, a block situated between two adjacent rails of the siding, it consisting of a short rail-section, $b$, a stop, T, and a supporting part, T', opposite the rail-section, the bearing in which the block is pivoted provided with a curved portion in which the part T' of the block rests when the rail-section $b$ is interposed between the permanent rails, and mechanism adapted to simultaneously move the switch and shift the block, substantially as set forth.

7. The combination, with the main line and the siding, of the switch in the main line, a stop on the siding adapted to be moved across the track in the path of the car-wheels and to be withdrawn therefrom, and mechanism which simultaneously moves said switch and stop, substantially as set forth.

8. The combination, with the main line and the siding, of the switch in the main line, a stop pivoted at one side of the siding and adapted to be alternately rocked forward to lie across and obstruct the track, and to be rocked back to leave the track clear, and mechanism which simultaneously moves the switch and rocks the stop, substantially as set forth.

In testimony whereof I affix my signature in presence of two witnesses.

WILLIAM H. DICKEY.

Witnesses:
M. HARMON,
GEO. S. BENNETT.